United States Patent
Li et al.

(10) Patent No.: US 9,755,731 B2
(45) Date of Patent: Sep. 5, 2017

(54) HARDWARE TCP ACCELERATOR

(71) Applicant: Hughes Network Systems, LLC, Germantown, MD (US)

(72) Inventors: Frank Li, Herndon, VA (US); John A. Schmid, Damestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 253 days.

(21) Appl. No.: 14/594,096

(22) Filed: Jan. 10, 2015

(65) Prior Publication Data
US 2016/0204851 A1  Jul. 14, 2016

(51) Int. Cl.
| | |
|---|---|
| H04L 29/06 | (2006.01) |
| H04B 7/185 | (2006.01) |
| H04L 1/16 | (2006.01) |
| H04L 12/931 | (2013.01) |

(52) U.S. Cl.
CPC ..... H04B 7/18515 (2013.01); H04B 7/18513 (2013.01); H04L 1/1657 (2013.01);
(Continued)

(58) Field of Classification Search
CPC ..... H04L 69/16; H04L 69/163; H04L 69/161; H04L 69/169; H04L 49/351;
(Continued)

(56) References Cited

U.S. PATENT DOCUMENTS 6,226,680 B1 * 5/2001 Boucher ............... G06F 5/10
709/230

7,360,083 B1 * 4/2008 Ragireddy .......... H04L 63/0428
713/160

(Continued)

FOREIGN PATENT DOCUMENTS

EP  1175051 A2  1/2002

OTHER PUBLICATIONS

Ping et al., "Design and Performance Analysis of Accelerator to Enhance TCP in Satellite IP Networks", Computer Science and Network Technology (ICCSNT), 2011 International Conference on Dec. 24-26, 2011, IEEE, p. 323-327.*

(Continued)

*Primary Examiner* — Michael Thier
*Assistant Examiner* — Rownak Islam
(74) *Attorney, Agent, or Firm* — Edell, Shapiro & Finnan LLC; Richard C. Irving (57) ABSTRACT

A TCP/IP packet decoder fetches, from a packet received via a satellite communication system, IP version information, which is provided to version comparators. When a version comparator indicates a match, protocol information is provided to a TCP comparator. If the TCP comparator determines that the packet is a TCP data packet, a flag is raised causing generation of a TCP acknowledgment for transmission to a source device. In another embodiment, a layer 3 switch or router includes a TCP hardware filter to determine whether the received packet is a TCP data packet, thereby causing the TCP data packet to be mirrored for transmission to a modem. In a third embodiment, a TCP hardware filter, provides an indication to a layer 2 switch when a TCP data packet is received causing the TCP data packet to be mirrored for transmission to a modem, which generates and transmits a TCP acknowledgment.

18 Claims, 6 Drawing Sheets

(52) U.S. Cl.
CPC .......... *H04L 49/351* (2013.01); *H04L 69/163* (2013.01); *H04L 69/169* (2013.01); *H04L 69/16* (2013.01)

(58) Field of Classification Search
CPC ... H04L 1/1657; H04L 63/166; H04L 69/166; H04L 69/165; H04B 7/18513; H04B 7/18515; H04W 84/06
USPC .......................................... 370/316, 395.52
See application file for complete search history.

(56) References Cited

U.S. PATENT DOCUMENTS

| | | | |
|---|---|---|---|
| 9,027,129 B1* | 5/2015 | Kancherla | H04L 63/1458 726/22 |
| 2003/0032391 A1 | 2/2003 | Schweinhart et al. | |
| 2004/0042487 A1* | 3/2004 | Ossman | H04L 29/06 370/466 |
| 2008/0098129 A1* | 4/2008 | Niddam | H04L 69/04 709/247 |
| 2012/0213210 A1 | 8/2012 | Thomasson et al. | |
| 2015/0382240 A1* | 12/2015 | Hecht | H04L 69/22 370/316 |

OTHER PUBLICATIONS

Ishac et al., "On the Performance of TCP Spoofing in Satellite Networks", Military Communications Conference, 2001, Oct. 28-31, 2001, IEEE, p. 700-704.*
International Search Report for corresponding PCT Application No. PCT/US2016/012891.

* cited by examiner

HARDWARE TCP ACCELERATOR

FIELD OF THE INVENTION

The invention relates to Transmission Control Protocol (TCP) spoofing in a system in which a long delay may exist between a time at which a TCP data packet is sent from a source and a time at which a TCP acknowledgment is received by the source. In particular, the invention relates to use of hardware to cause a TCP acknowledgment to be quickly transmitted to the source, via a satellite communication system, in response to receiving a TCP data packet from the source. Due to propagation delay inherent in satellite communication systems as well as latency due to protocol layers of network gateways, a received TCP data packet is acknowledged before the TCP data packet is received by a destination device, thereby reducing the propagation delay.

BACKGROUND

Satellite communication systems introduce additional latency due to propagation delay between communicating source and destination devices. Non-critical applications, including but not limited to, Voice over Internet Protocol (VoIP), Internet Protocol Television (IPTV), and stream media typically use a User Datagram Protocol (UDP), which provides one-way communication. Unlike TCP data packets, received UDP packets are not acknowledged to a source. Therefore, the additional latency caused by the satellite communication systems does not cause a problem when using the UDP.

The TCP provides reliable communication between a source device and a destination device. As data is received in a TCP data packet, the destination device responds with a TCP acknowledgment packet. The source device keeps a record of each TCP data packet that the source device sends. The source device also maintains a timer, which is started when the TCP data packet is sent, and retransmits the TCP data packet if the timer expires before a corresponding TCP acknowledgment packet is received from the destination device. The timer may expire 0.5 seconds, or another suitable time period, after being started if no corresponding TCP acknowledgment packet is received. When using a satellite communication system to communicate TCP data packets and corresponding TCP acknowledgment packets between the source device and the destination device, propagation delay may be on an order of seconds, thereby preventing the source from receiving TCP acknowledgment packets within the timeout period.

TCP spoofing may be used to solve the problem caused by the propagation delay introduced by satellite communication systems. One solution was provided in which an application processor executed software to process packets received via a satellite communication system before the packets are routed over a local area network to a destination. The software, when executed by the application processor, caused the application processor to parse each received packet to determine whether a received packet, which was communicated via a system having a large propagation delay such as a satellite communication system, was a TCP data packet. If the received packet was determined to be the TCP data packet, then the application processor generated a corresponding TCP acknowledgment packet for transmission back to a source of the TCP data packet. The application processor forwarded received packets toward the destination in a local area network, and generated a corresponding TCP acknowledgment packet to send to the source only when the received packet was determined to be the TCP data packet.

Currently, most traffic between a source and a destination communicating via a satellite communication system is non-TCP traffic. The one solution, described above, reduced the propagation delay between a source and a destination, but was very inefficient because each and every received packet was parsed by the application processor to determine whether the received packet was the TCP data packet. Due to the workload caused by parsing, the application processor employed in the one solution was a high-performance processor that consumed more power and increased system cost. As a result, the TCP spoofing as implemented by software in the one solution introduced parsing delays for all traffic, thereby delaying UDP traffic, reducing Quality of Service (QoS) for VoIP, and slowing streamed media.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment, a hardware TCP accelerator for use in a satellite communication system is provided. The hardware TCP accelerator includes a reception data buffer, a transmission data buffer, a TCP acknowledgement generator, and a hardware TCP filter. The reception data buffer is for receiving a first packet from a wide area network via the satellite communication system. The transmission data buffer is for storing a second packet and all packets for transmission. The hardware TCP filter is for fetching first information from the first packet in the reception data buffer, while forwarding the first packet to a destination in a local area network, and determining whether the first packet is a TCP data packet. When the hardware TCP filter determines that the first packet is the TCP data packet, the TCP acknowledgement generator receives TCP information and generates the second packet for placement in the transmit buffer. The second packet is transmitted causing a TCP acknowledgment packet to be transmitted to a source of the first packet via the satellite communication system and the wide area network.

In a second embodiment, a network switch or router supports TCP spoofing. A hardware TCP accelerator includes a reception data buffer, a transmission data buffer, a TCP acknowledgement generator, and a hardware TCP filter. A first packet is received into a reception data buffer. The first packet in the reception data buffer is made available to a network switch or a router and is simultaneously forwarded to a destination connected to a local area network. A hardware TCP filter fetches first information from the first packet in the reception data buffer and determines whether the first packet is a TCP data packet. After the hardware TCP filter determines that the first packet is the TCP data packet, the TCP data packet is mirrored to the TCP acknowledgement generator from the network switch or the router. The TCP acknowledgement generator receives the mirrored TCP data packet, generates a second packet, and sends the second packet to a transmission data buffer. The second packet is transmitted from the transmission data buffer, thereby causing a TCP acknowledgment packet to be transmitted to the source via the wide area network.

In a third embodiment, an apparatus for use in a satellite communication system is provided. The apparatus includes a reception data buffer, a transmission data buffer, a TCP acknowledgement generator, and a hardware TCP filter. The reception data buffer is for receiving a first packet from a source via the satellite communication system. The transmission data buffer is for storing a second packet and all packets for transmission. The hardware TCP filter is for fetching first information from the first packet while forwarding the first packet to a destination in a local area network, and determining whether the first packet is a TCP data packet. When the hardware TCP filter determines that the first packet is the TCP data packet, the TCP data packet is sent to the TCP acknowledgement generator. The TCP acknowledgement generator receives the TCP data packet, generates the second packet, and sends the second packet to the transmission data buffer for transmission. The transmission of the second packet causes a TCP acknowledgment packet to be transmitted to the source of the first packet via the satellite communication system. The apparatus is a complex programmable logic device, a field programmable gate array, or an application specific integrated circuit.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

A TCP hardware accelerator is provided. In one embodiment, the hardware TCP accelerator receives traffic from a source via a satellite communication system. The satellite communication system may communicate with the source via a wide area network (WAN), which may further include the Internet.

In a first embodiment, a TCP hardware accelerator may include a hardware TCP filter. The hardware TCP filter may include a TCP/IP packet decoder and a number of comparators. The TCP/IP packet decoder may obtain information from a packet received via a satellite communication system and may provide the information to a first set of multiple comparators for determining a version of Internet Protocol (IP) to which the received packet pertains. Each of the first set of multiple comparators has a corresponding comparator of a second set of multiple comparators for determining whether the received packet is a TCP data packet of the determined version of the IP. If the received packet is determined to be a TCP data packet of the determined version of the IP, a flag may be set thereby providing a signal to an application processor including a TCP acknowledgment generator. The TCP acknowledgment generator may generate a TCP acknowledgment packet, corresponding to the TCP data packet, which may be transmitted to a source of the TCP data packet via the satellite communication system. The application processor may forward, at line speed, all traffic received via the satellite communication system to a destination in a local area network directly without parsing.

In a second embodiment, a satellite modem having a TCP acknowledgment generator may be provided. The TCP acknowledgment generator may be implemented by an application processor executing software. Traffic communicated via a satellite communication system may be received by a satellite modem and provided to a hardware TCP accelerator. The hardware TCP accelerator may be supported by a layer 3 switch, or a router, which receives packets from the satellite modem. The layer 3 switch, or the router, may include a hardware TCP filter for determining whether each received packet from the satellite modem is a TCP data packet of one of a number of IP versions. The layer 3 switch, or the router, may route each received packet to a corresponding destination in a local area network, while at the same time determining, by the hardware TCP filter, whether each of the received packets is a TCP data packet of one of a number of IP versions. If a respective received packet is determined to be the TCP data packet of the one of the number of IP versions, the layer 3 switch, or the router, may mirror the TCP data packet back to the satellite modem. The TCP acknowledgment generator of the satellite modem may generate a TCP acknowledgment packet corresponding to the mirrored TCP data packet and the satellite modem may transmit the TCP acknowledgment packet to a source of the received packet via the satellite communication system.

In a third embodiment, a satellite modem including a TCP acknowledgment generator may receive a packet from a source via a satellite communication system and may provide the received packet to a hardware TCP accelerator, which is further connected to a layer 2 switch. The hardware TCP accelerator may include a hardware TCP filter as described with respect to the first embodiment. The hardware TCP accelerator may provide the received packet to the layer 2 switch, or the router, for routing to a destination in a local area network while the hardware TCP filter determines whether the received packet is a TCP data packet of one of a number of IP versions. When the hardware TCP filter determines the received packet to be the TCP data packet of the one of the number of IP versions, a flag corresponding to the one of the number of IP versions may be set to thereby send a signal to the layer 2 switch indicating that the received packet is the TCP data packet of the one of the number of IP versions. In response to receiving the signal, the layer 2 switch may mirror the received TCP data packet to the hardware TCP accelerator, which further transmits the mirrored TCP data packet to the satellite modem. The TCP acknowledgment generator included in the satellite modem may generate a TCP acknowledgment packet, corresponding to the mirrored TCP data packet, and the satellite modem may transmit the TCP acknowledgment packet to a source of the TCP data packet via the satellite communication system.

Exemplary Operating Environment

Figure 1:
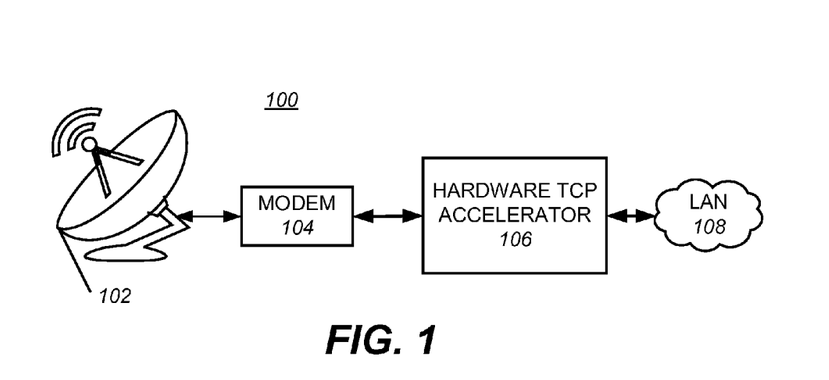
FIG. 1 illustrates an exemplary operating environment for various embodiments.

FIG. 1 illustrates an exemplary operating environment 100 for various embodiments. Operating environment 100 may include a satellite antenna 102, a modem 104, a hardware TCP accelerator 106 and a local area network (LAN) 108. Satellite antenna 102 may transmit signals, including packets, to a satellite gateway (not shown) via a satellite (not shown) and may receive signals, including packets, from the satellite gateway via the satellite. The satellite gateway may further be connected to a wide area network (WAN) including, but not limited to, the Internet. Modem 104 may receive packets from and may send packets to one or more devices connected to the WAN via satellite antenna 102, and may receive packets from and may send packets to one or more devices connected to LAN 108 via hardware TCP accelerator 106.

First Embodiment

Figure 2:
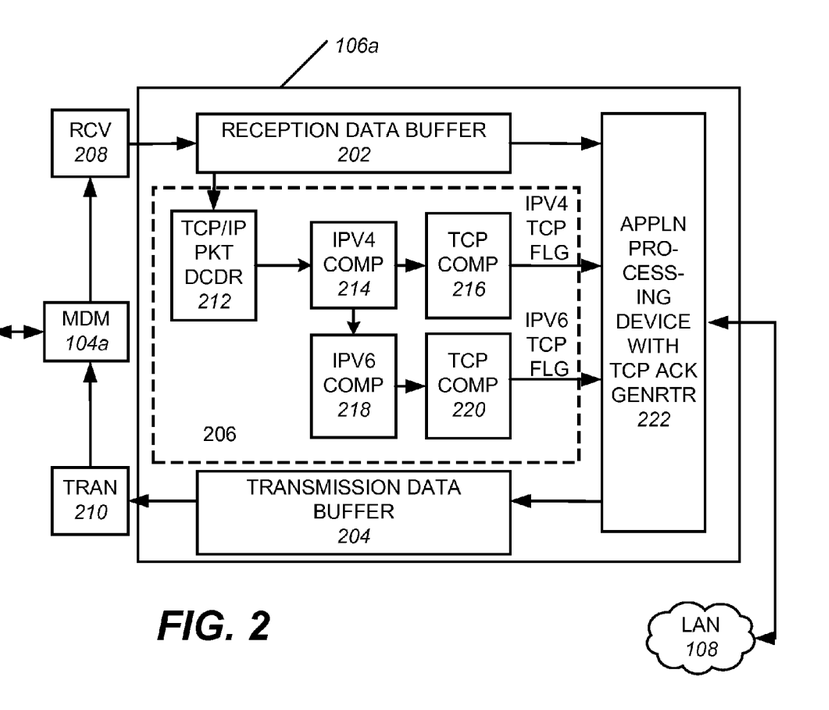
FIG. 2 shows a first embodiment of a hardware TCP accelerator.

FIG. 2 illustrates a first embodiment of hardware TCP accelerator 106a. Hardware TCP accelerator 106a may include a reception data buffer 202, a transmission data buffer 204, a hardware TCP filter 206, and a TCP acknowledgment generator 222. Hardware TCP filter 206 may include a TCP/IP packet decoder 212, an IP version 4 comparator 214, a TCP comparator 216, an IP version 6 comparator 218, a TCP comparator 220, and a TCP acknowledgment generator 222. TCP acknowledgment generator 222 may be implemented by a network application processing device. Hardware TCP filter 206 may be implemented inside a Complex Programmable Logic Device (CPLD) or a Field Programmable Gate Array (FPGA). In an alternative implementation, reception data buffer 202 and transmission data buffer 204 may be included within the CPLD or the FPGA. As a second alternative implementation, hardware TCP filter 206 may be implemented inside the FPGA or an Application Specific Integrated Circuit (ASIC) and may include a processor. In the second alternative implementation, a network application processing device may be provided between TCP hardware accelerator 106a and LAN 108. In a variation of the second alternative implementation, TCP acknowledgment generator 222 may be implemented by the processor of the FPGA or the ASIC instead of the network application processing device.

A modem 104a may transmit packets and may receive packets via a satellite communication system in order to communicate with one or more devices connected to a WAN. Modem 104a may provide received packets to receiver 208, which further provides the received packets to reception data buffer 202 of TCP hardware accelerator 106a. Transmission data buffer 204 of TCP hardware accelerator 106a may provide packets to be transmitted to transmitter 210, which further provides the packets to modem 104a for transmission, via the satellite communication system, to the one or more devices connected to the WAN.

Figure 3:
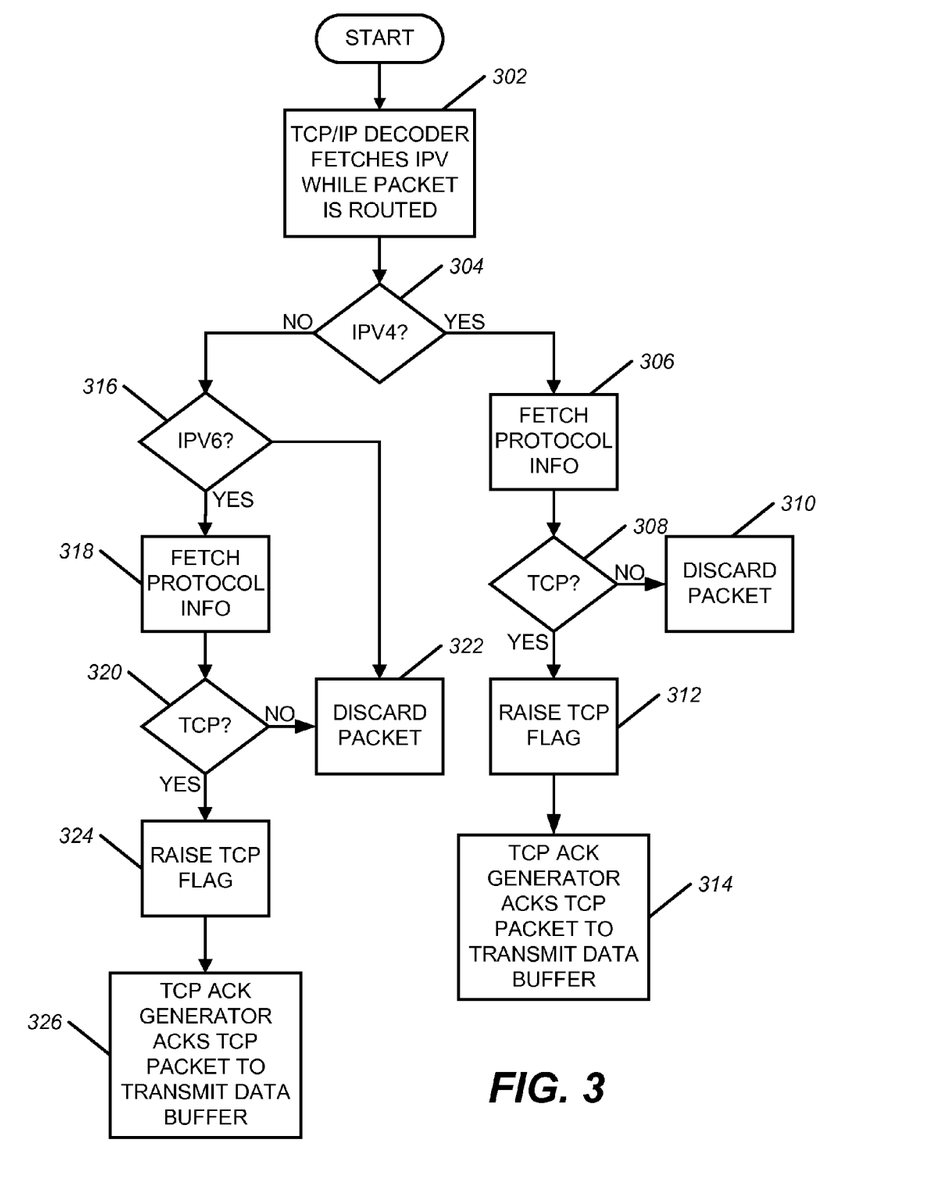
FIG. 3 is a flowchart that illustrates operation of the hardware TCP accelerator in the first embodiment.

FIG. 3, with reference to FIG. 2, illustrates exemplary operation of hardware accelerator 106a. We assume that modem 104a received a packet from a source device connected to the WAN and provided the received packet to reception data buffer 202 via receiver 208. TCP/IP packet decoder 212 fetches an IP version from the received packet while the packet is simultaneously routed to a destination connected to LAN 108 via application processing device 222 (act 302). TCP/IP packet decoder 212 may provide the IP version to multiple IP version comparators. In this example, the IP version is provided to IP version 4 comparator 214 and IP version 6 comparator 218 to determine to which of the multiple IP versions the received packet pertains.

If IP version comparator 214 determines that the received packet pertains to IP version 4 (act 304), then TCP/IP packet decoder 212 may fetch protocol information from the received packet (act 306). The protocol information may be provided to TCP comparator 216 to determine whether the fetched protocol information indicates that the received packet is a TCP data packet (act 308). If TCP comparator 216 determines that the received packet is not the TCP data packet, then the received packet may be discarded (act 310). Otherwise, TCP comparator 216 may set, or raise, an IP version 4 TCP flag (act 312), which is provided to TCP acknowledgment generator of application processing device 222. Upon receiving an indication of the set, or raised, IP version 4 TCP flag, the TCP acknowledgment generator may generate a TCP acknowledgment packet and provide the TCP acknowledgment packet to transmission data buffer 204 (act 314). Transmission data buffer 204 may then provide the TCP acknowledgment packet to transmitter 210, which further provides the TCP acknowledgment packet to modem 104a for transmission, via the satellite communication system, to the source connected to the WAN.

If, during act 304, the received packet is determined not to pertain to IP version 4, then IP version 6 comparator 218 determine whether the fetched IP version indicates that received packet pertains to IP version 6 (act 316). If the received packet does not pertain to IP version 6, then the received packet may be discarded (act 322). Otherwise, if the received packet is determined to pertain to IP version 6, TCP/IP packet decoder 212 may fetch protocol information from the received packet (act 318) and may provide the protocol information to TCP comparator 220 to determine whether the received packet pertaining to IP version 6 is a TCP data packet (act 320). If the received packet is determined not to be the TCP data packet, then the received packet may be discarded (act 322). Otherwise, TCP comparator 220 may set, or raise, an IP version 6 TCP flag (act 324), which is provided to TCP acknowledgment generator of application processing device 222. Upon receiving an indication of the set, or raised, IP version 6 TCP flag, the TCP acknowledgment generator may generate a TCP acknowledgment packet and may provide the generated TCP acknowledgment packet to transmission data buffer 204 (act 326). Transmission data buffer 204 may then provide the TCP acknowledgment packet to transmitter 210, which further provides the generated TCP acknowledgment packet to modem 104a for transmission, via the satellite communication system, to the source connected to the WAN.

Second Embodiment

Figure 4:
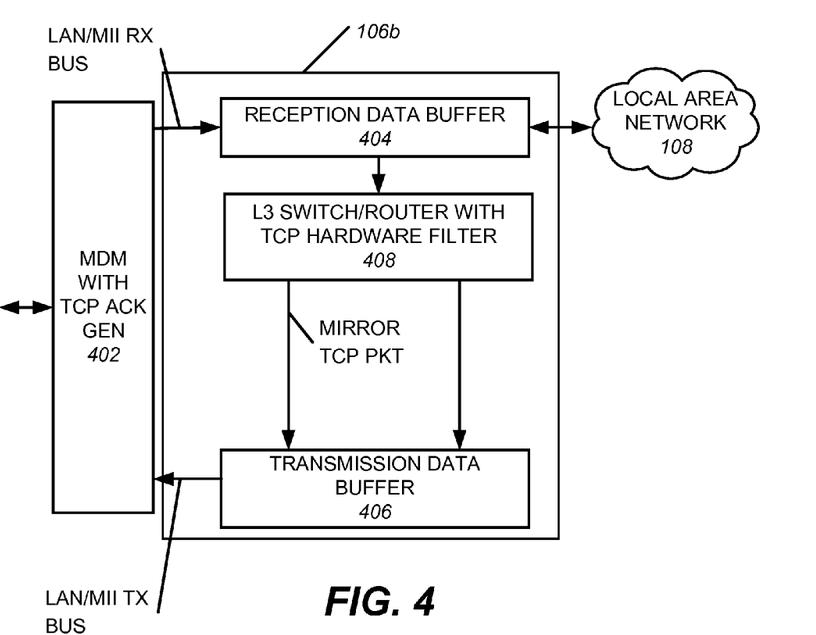
FIG. 4 illustrates a second embodiment in which the hardware TCP accelerator includes a layer 3 switch or router with a TCP hardware filter.

FIG. 4 illustrates a second embodiment. In this embodiment, hardware TCP accelerator 106b may include a reception data buffer 404, a transmission data buffer 406, and a layer 3 switch, or a router 408, with a hardware TCP filter. A modem 402 may include an application processing device, which may further implement a TCP acknowledgment generator. Modem 402 may receive packets from and transmit packets to a source device connected to a WAN, which is further connected to a satellite communication system. Modem 402 may communicate, via the satellite communication system, with the source device. Upon receiving a packet from the source device, modem 402 may provide the received packet to a reception data buffer 404 via a LAN interface, a Media Independent Interface (MII) receive bus, or other communication medium. Modem 402 may receive packets from a transmission data buffer 406 via a LAN interface or a MII transmit bus, or other communication medium.

Figure 5:
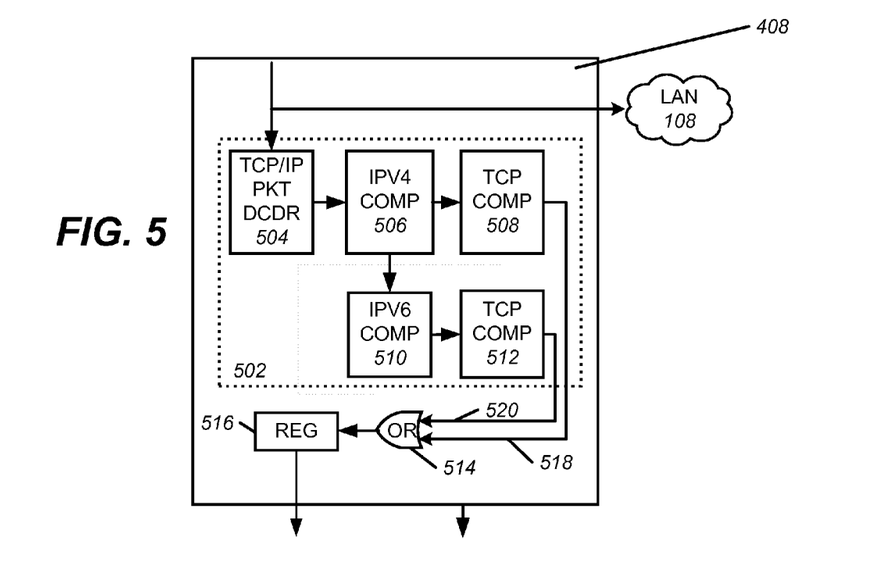
FIG. 5 illustrates a detailed view of the layer 3 switch or router and the hardware TCP filter included therein.

FIG. 5 illustrates hardware TCP filter 502 within layer 3 switch or router 408 in more detail. Hardware TCP filter 502 may include a TCP/IP packet decoder 504, an IP version 4 comparator 506, a TCP comparator 508, an IP version 6 comparator 510, and a TCP comparator 512.

Figure 6:
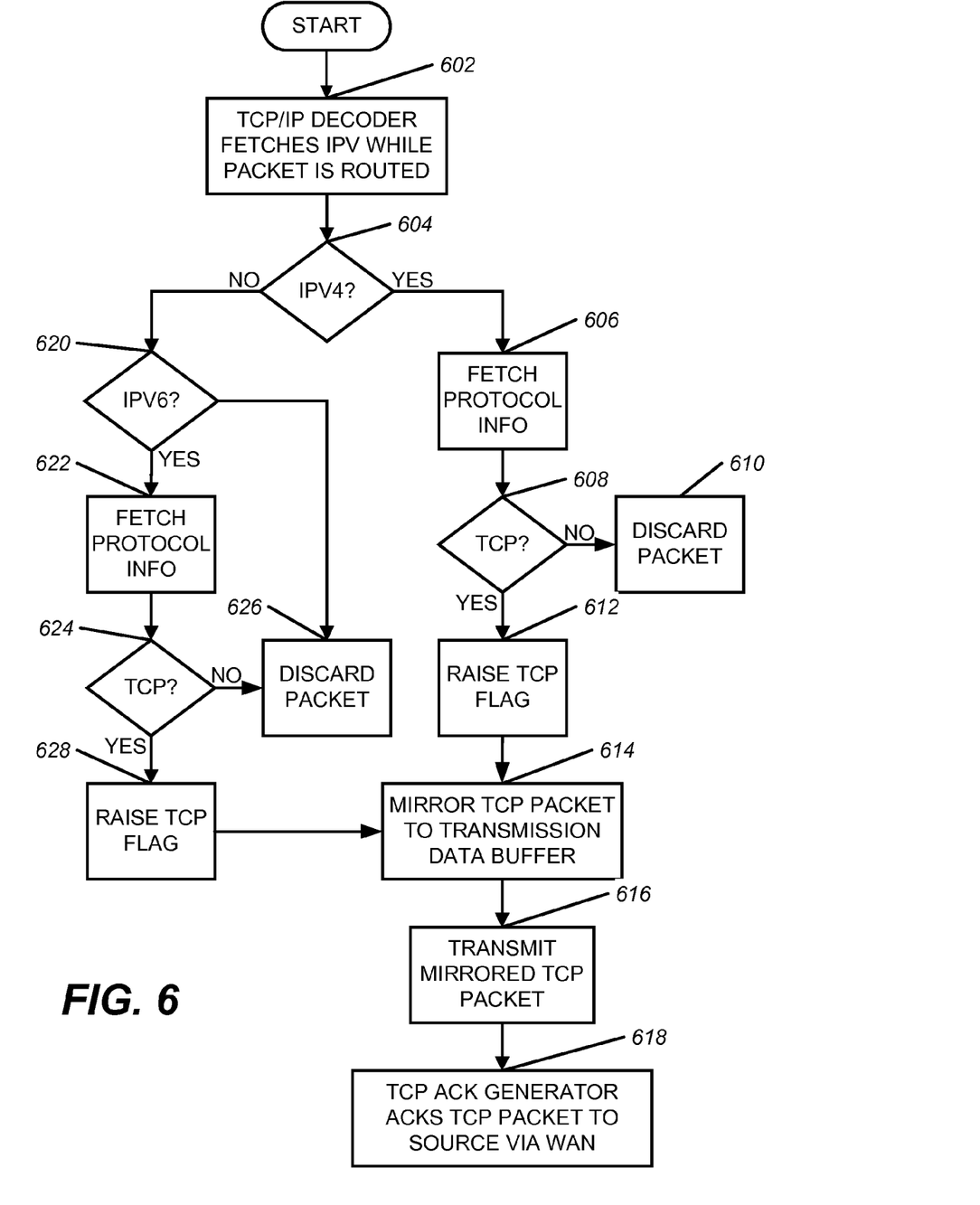
FIG. 6 is a flowchart explaining operation of the hardware TCP accelerator in the second embodiment.

Operation of hardware TCP filter 502 is discussed with reference to FIG. 6. We assume that modem 402 (FIG. 4) received a packet from a source device connected to a WAN and provided the received packet to reception data buffer 404 via the LAN or MII receive bus. TCP/IP packet decoder 504 may fetch an IP version from the received packet while the packet is simultaneously routed to a destination connected to LAN 108 (act 602). TCP/IP packet decoder 212 may provide the IP version to multiple IP version comparators. In this example, the IP version may be provided to IP version 4 comparator 506 and IP version 6 comparator 510 to determine to which of the multiple IP versions the received packet pertains.

If IP version comparator 506 determines that the received packet pertains to IP version 4 (act 604), then TCP/IP packet decoder 504 may fetch protocol information from the received packet (act 606). The protocol information may be provided to TCP comparator 508 to determine whether the fetched protocol information indicates that the received packet is a TCP data packet of IP version 4 (act 608). If TCP comparator 508 determines that the received packet is not the TCP data packet, then the received packet may be discarded (act 610). Otherwise, TCP comparator 508 may set, or raise, an IP version 4 TCP flag 518, which is provided to or gate 514 (act 612). Output of or gate 514 may be provided to register 516, which may include contents of the received packet from reception data buffer 404. When output of or gate 514 is set, or raised, then the received packet in register 516 (i.e., the TCP data packet) may be mirrored to transmission data buffer 406 (act 614). The received packet stored in register 516 may then be sent to TCP acknowledgment generator within modem 402, which generates and transmits a TCP acknowledgment packet, via a satellite communication system, to a source device connected to a WAN (act 618).

If, during act 604, the received packet is determined not to pertain to IP version 4, then IP version 6 comparator 508 may determine whether the fetched IP version indicates that the received packet pertains to IP version 6 (act 620). If the received packet does not pertain to IP version 6, then the received packet may be discarded (act 626). Otherwise, if the received packet is determined to pertain to IP version 6, TCP/IP packet decoder 504 may fetch the protocol information from reception data buffer 404 (act 622) and may provide the protocol information to TCP comparator 512 to determine whether the received packet pertaining to IP version 6 is a TCP data packet (act 624). If the received packet is determined not to be the TCP data packet, then the received packet may be discarded (act 626). Otherwise, TCP comparator 512 may raise an IP version 6 TCP flag 520, which may be provided to or gate 514 (act 628). Output of or gate 514 may be provided to register 516, which may include contents of the received packet from reception data buffer 404. When output of or gate 514 is set to one, then the received packet in register 516 (i.e., the TCP data packet) may be mirrored to transmission data buffer 406 (act 614). The received packet stored in register 516 may then be sent to TCP acknowledgment generator within modem 402, which generates and transmits a TCP acknowledgment packet, via a satellite communication system, to the source device connected to the WAN (act 618).

Third Embodiment

Figure 7:
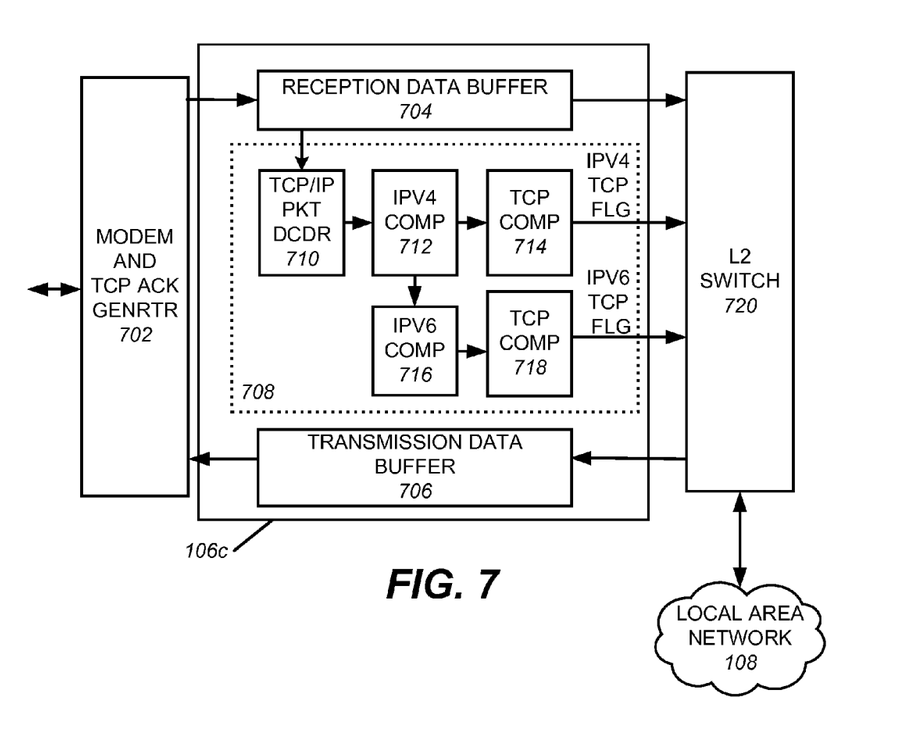
FIG. 7 shows a hardware TCP accelerator including a hardware TCP filter in a third embodiment.

FIG. 7 shows a third embodiment. In the third embodiment, a hardware TCP accelerator 106c may include a reception data buffer 704, a transmission data buffer 706, and a hardware TCP filter 708. Hardware TCP filter 708 may include a TCP/IP packet decoder 710, an IP version 4 comparator 712, a TCP comparator 714, an IP version 6 comparator 716, and a TCP comparator 718. A modem 702 may include an application processing device, which may implement a TCP acknowledgment generator for generating a TCP acknowledgment packet. Modem 702 may communicate with a satellite communication system, may provide received packets to reception data buffer 704, and may transmit packets received from transmission data buffer 706. A layer 2 switch 720 may receive packets from reception data buffer 704 and may route packets to a destination device connected to local area network 108. Similarly, layer 2 switch 720 may receive packets from a device connected to local area network 108 and may provide the received packets to transmission data buffer 706.

Figure 8:
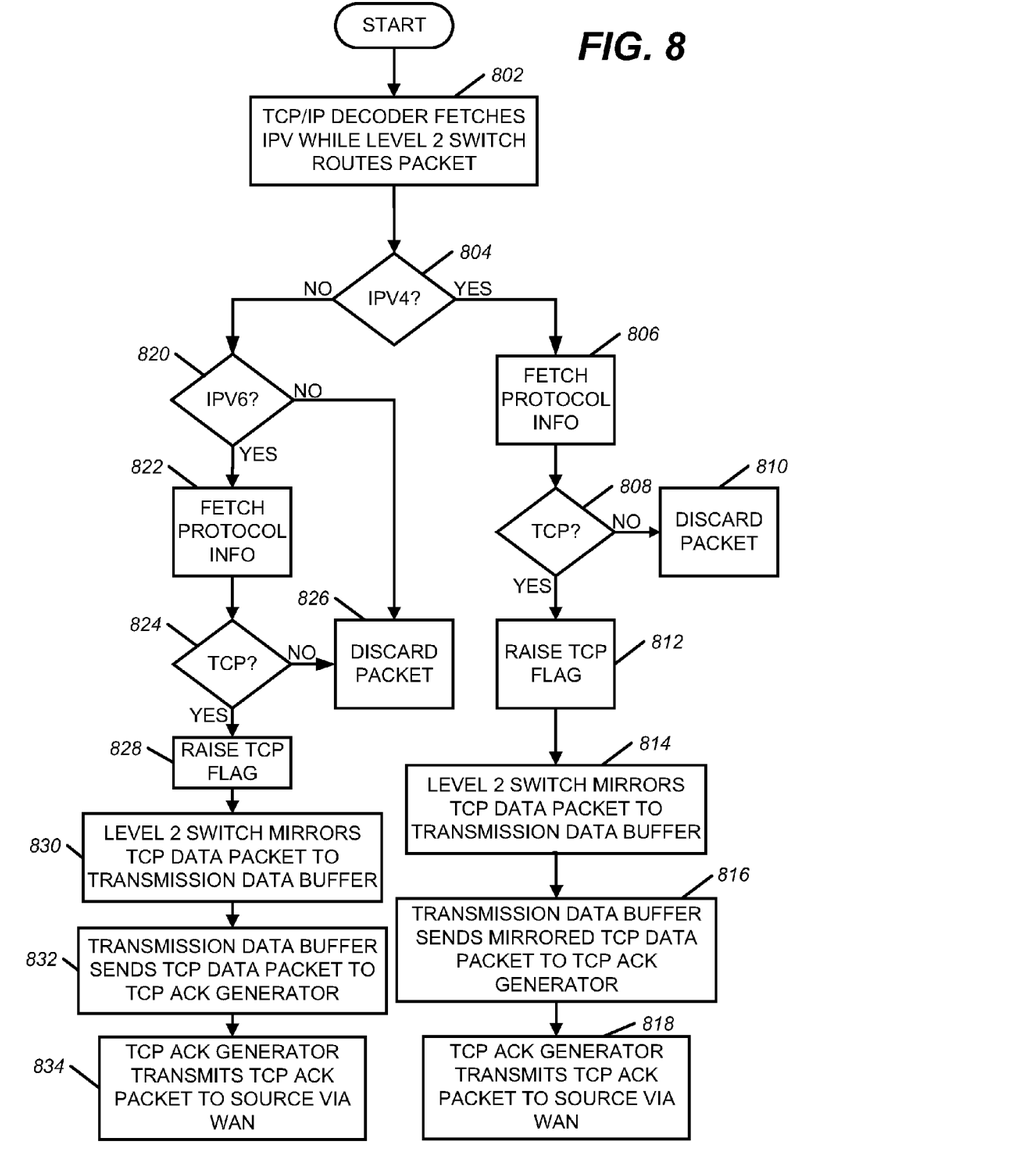
FIG. 8 is a flowchart that explains operation of the hardware TCP accelerator in the third embodiment.

Operation of this embodiment is explained with reference to FIGS. 8 and 7. We assume that modem 402 received a packet from a source device connected to a WAN and provided the received packet to reception data buffer 704 via a LAN/MII receive bus. TCP/IP packet decoder 710 may fetch an IP version from the received packet while the packet is simultaneously sent at line speed through layer 2 switch 720 to a destination connected to LAN (act 802). TCP/IP packet decoder 710 may provide the IP version to multiple IP version comparators. In this example, the IP version is provided to IP version 4 comparator 712 and IP version 6 comparator 716 to determine to which of the multiple IP versions the received packet pertains.

If IP version comparator 714 determines that the received packet pertains to IP version 4 (act 804), then TCP/IP packet decoder 710 may fetch protocol information from the received packet (act 806). The protocol information may be provided to TCP comparator 714 to determine whether the fetched protocol information indicates that the received packet is a TCP data packet (act 808). If TCP comparator 714 determines that the received packet is not the TCP data packet, then the received packet may be discarded (act 810). Otherwise, TCP comparator 714 may set, or raise, an IP version 4 TCP flag, which is provided to layer 2 switch 720, which further causes layer 2 switch 720 to mirror the TCP data packet to transmission data buffer 706 (act 814). Transmission data buffer 706 may then provide the mirrored TCP data packet to modem 402 (act 816). The TCP acknowledgment generator, included in modem 402, may generate a TCP acknowledgment packet and modem 402 may transmit the generated TCP acknowledgment packet, via a satellite communication system, to the source device connected to the WAN (act 818).

If, during act 804, the received packet is determined not to pertain to IP version 4, then IP version 6 comparator 716 may determine whether the fetched IP version indicates that the received packet pertains to IP version 6 (act 820). If the received packet does not pertain to IP version 6, then the received packet may be discarded (act 826). Otherwise, if the received packet is determined to pertain to IP version 6, TCP/IP packet decoder 710 may fetch protocol information from the received packet (act 822) and may provide the protocol information to TCP comparator 718 to determine whether the received packet pertaining to IP version 6 is a TCP data packet (act 824). If the received packet is determined not to be the TCP data packet, then the received packet may be discarded (act 826). Otherwise, TCP comparator 718 may set, or raise, an IP version 6 TCP flag (act 828), which is provided to layer 2 switch 720, which further causes layer 2 switch 720 to mirror the TCP data packet to transmission data buffer 706 (act 830). Transmission data buffer 706 may then provide the mirrored TCP data packet to the TCP acknowledgment generator included in modem 402 (act 832). The TCP acknowledgment generator further generates a TCP acknowledgment packet and modem 402 provides the generated TCP acknowledgment packet, via the satellite communication system, to the source device connected to the WAN (act 834).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A hardware TCP accelerator for use in a satellite communication system, comprising:
    a reception data buffer to receive a first packet from a wide area network via the satellite communication system;
    a transmission data buffer to store a second packet for transmission; and
    a hardware TCP filter to:
        forward, at line speed, the first packet to a destination in a local area network,
        fetch first information from the first packet in the reception data buffer, and
        determine whether the first packet is a TCP data packet based on the first information, wherein:
    either a TCP acknowledgment generator is included in the hardware TCP accelerator or the TCP acknowledgment generator is included in a satellite modem for communicating with the wide area network via the satellite communication system and for communicating with the local area network via the hardware TCP accelerator,
    when the TCP acknowledgment generator is included in the hardware TCP accelerator:
        the TCP acknowledgment generator is included in an application processing device included in the hardware TCP accelerator, the application processing device being arranged to receive incoming information from the reception data buffer and a TCP flag from the hardware TCP filter and being further arranged to provide TCP information in the second packet to the transmission data buffer to be transmitted to the satellite modem, the TCP information in the second packet being provided to the transmission data buffer from the application processing device when the hardware TCP filter provides a set TCP flag to the application processing device indicating that the received first packet is the TCP data packet, transmission of the second packet from the transmission data buffer causing a TCP acknowledgment to be transmitted to a source of the first packet via the satellite communication system and the wide area network; and
    when the TCP acknowledgment generator is included in the satellite modem,
        when the hardware TCP filter determines that the first packet is the TCP data packet, the TCP data packet is mirrored to the transmission data buffer for transmission to the satellite modem, and
        upon receiving the mirrored TCP data packet, the TCP acknowledgment generator included in the satellite modem generates the TCP acknowledgment which is transmitted by the satellite modem via the satellite communication system and the wide area network to the source.

2. The hardware TCP accelerator of claim 1, wherein the hardware TCP filter further comprises:
    a TCP/IP packet decoder to fetch an IP version from the first packet in the reception data buffer;
    a plurality of IP version comparators, each of which is associated with a different respective version, to determine whether the fetched IP version is any one of the different respective versions;
    a plurality of TCP comparators, each respective TCP comparator of the plurality of TCP comparators is associated with a respective IP version comparator of the plurality of IP version comparators, determines whether the first packet is the TCP data packet of a respective one of the different respective versions, and sets a corresponding TCP flag when the respective TCP comparator determines that the first packet is the TCP data packet of the respective one of the different respective versions;
    the TCP acknowledgment generator is included in the hardware TCP accelerator to generate the TCP acknowledgment and place the generated TCP acknowledgment in the transmission data buffer when any one of the corresponding TCP flags indicates that the first packet is the TCP data packet, wherein:
    when any of the plurality of IP version comparators determines that the fetched IP version indicates the respective one of the different respective versions:
        the TCP/IP packet decoder fetches, from the first packet, protocol information of the respective one of the different respective versions, and provides the protocol information to the TCP comparator associated with the any one of the plurality of IP version comparators;

the TCP comparator determines whether the first packet is the TCP data packet based on the protocol information and sets a corresponding TCP flag, associated with the respective one of the different respective versions, when the TCP comparator determines that the first packet is the TCP data packet of the respective one of the different respective versions; and the TCP acknowledgment generator generates the TCP acknowledgment, places the generated TCP acknowledgment in the second packet, and provides the second packet to the transmission data buffer for transmission over the wide area network via the satellite communication system when the any one of the plurality of TCP flags is set.

3. The hardware TCP accelerator of claim 2, wherein the hardware TCP filter is included in an application specific integrated circuit or a field programmable gate array.

4. The hardware TCP accelerator of claim 1, wherein:
the TCP acknowledgment generator is included in the satellite modem,
the hardware TCP filter is included in either a layer 3 switch or a router,
the layer 3 switch or the router is arranged to receive the first packet from the reception data buffer,
the hardware TCP filter determines whether the first packet is the TCP data packet, and
when the hardware TCP filter determines that the first packet is the TCP data packet, the TCP information is provided in the second packet which is further provided to the transmission data buffer for transmission to the TCP acknowledgement generator.

5. The hardware TCP accelerator of claim 4, wherein:
the layer 3 switch or the router routes the first packet to the destination.

6. The hardware TCP accelerator of claim 1, wherein the hardware TCP filter further comprises:
a TCP/IP packet decoder to fetch an IP version from the first packet in the reception data buffer;
a plurality of IP version comparators, each of which is associated with a different respective version, to determine whether the fetched IP version is any one of the different respective versions;
a plurality of TCP comparators, each respective TCP comparator of the plurality of TCP comparators is associated with a respective IP version comparator of the plurality of IP version comparators, and is for determining whether the first packet is the TCP data packet of a respective one of the different respective versions; and
a plurality of TCP flags, each of which is associated with a respective TCP comparator of the plurality of TCP comparators to indicate that the first packet is the TCP data packet of the respective one of the different respective versions, wherein:
the hardware TCP accelerator routes all received traffic from the wide area network at line speed through a layer 2 switch,
the TCP acknowledgment generator is included in the satellite modem,
when any of the plurality of IP version comparators determines that the fetched IP version indicates the respective one of the different respective versions:

the TCP/IP packet decoder fetches protocol information of the respective one of the different respective versions, and the TCP comparator associated with the any one of the plurality of IP version comparators determines whether the first packet is the TCP data packet based on the protocol information of the respective one of the different respective versions and sets the corresponding TCP flag, associated with the respective one of the different respective versions, when the TCP/IP packet decoder determines that the first packet is the TCP data packet of the respective one of the different respective versions;

when the layer 2 switch receives the corresponding set TCP flag indicating that the first packet is the TCP data packet:
the transmission data buffer receives the mirrored TCP data packet from the layer 2 switch.

7. A method of performing TCP spoofing comprising:
receiving, from a satellite communication system into a reception data buffer of a hardware TCP accelerator, a first packet from a source connected to a wide area network, which is further connected to the satellite communication system;
forwarding, at line speed, the first packet to a destination connected to a local area network;
fetching, by a hardware TCP filter of the hardware TCP accelerator, first information from the first packet in the reception data buffer;
determining, by the hardware TCP filter, whether the first packet is a TCP data packet based on the first information;
when a TCP acknowledgment generator is included in the hardware TCP accelerator, performing:
receiving, by the TCP acknowledgment generator included in an application processing device, the first packet from the reception data buffer and a TCP flag from the hardware TCP filter of the hardware TCP accelerator,
providing, from the TCP acknowledgment generator to a transmission data buffer of the hardware TCP accelerator, TCP information in a second packet, the TCP information being provided from the TCP acknowledgment generator when the hardware TCP filter provides a set TCP flag to the TCP acknowledgement generator in the application processing device indicating that the received first packet is the TCP data packet, and
transmitting the second packet from the transmission data buffer, the transmitting causing a TCP acknowledgment packet to be transmitted to the source via the satellite communication system and the wide area network; and
when the TCP acknowledgment generator is included in a satellite modem that further communicates with the wide area network via the satellite communication system, performing:
providing the first packet to the hardware TCP filter of the hardware TCP accelerator,
mirroring the TCP data packet to the transmission data buffer for transmission to the satellite modem when the hardware TCP filter determines that the first packet is the TCP data packet, and
generating, by the TCP acknowledgment generator in the satellite modem upon receiving the mirrored TCP data packet, the TCP acknowledgment packet which is transmitted by the satellite modem via the satellite communication system and the wide area network to the source.

8. The method of claim 7, wherein:
the fetching first information from the first packet in the reception data buffer further comprises:
fetching, by a TCP/IP packet decoder of the TCP hardware filter, an IP version from the first packet,
providing, by the TCP/IP packet decoder, the IP version to each of a plurality of IP version comparators, each of the plurality of IP version comparators being associated with a respective different version of a plurality of IP versions; and
the determining whether the first packet is the TCP data packet further comprises:
determining whether the IP version matches one of the plurality of IP version comparators, and
when the IP version matches the one of the plurality of IP version comparators, fetching, by the TCP/IP packet decoder, protocol information and providing the protocol information to a TCP comparator associated with the one of the plurality of IP version comparators;
determining, by the TCP comparator associated with the one of the plurality of IP version comparators, whether the first packet is the TCP data packet based on the protocol information, and
setting the TCP flag to indicate that the first packet is the TCP data packet when the first packet is determined to be the TCP data packet.

9. The method of claim 8, further comprising:
providing the set TCP flag from the TCP comparator associated with the one of the plurality of IP version comparators to a layer 2 switch when the TCP comparator determines that the first packet is the TCP data packet, wherein
the mirroring of the TCP data packet to the transmission data buffer for transmission to the satellite modem occurs after the hardware TCP filter provides the set TCP flag to the layer 2 switch, the mirroring further comprises:
receiving, into the transmission data buffer from the layer 2 switch, a copy of the TCP data packet.

10. The method of claim 8, further comprising:
providing the set TCP flag from the TCP comparator associated with the one of the plurality of IP version comparators to the TCP acknowledgment generator included in the hardware TCP accelerator when the TCP comparator determines that the first packet is the TCP data packet, wherein
the providing, from the TCP acknowledgment generator to a transmission data buffer of the hardware TCP accelerator, TCP information in the second packet further comprises:
receiving the second packet from the TCP acknowledgment generator in response to providing the set TCP flag to the TCP acknowledgment generator, the second packet including the TCP acknowledgment packet.

11. The method of claim 7, wherein:
the TCP acknowledgment generator is included in the satellite modem,
the hardware TCP filter is included in a layer 3 switch or a router,
when the hardware TCP filter determines that the first packet is the TCP data packet, the layer 3 switch or the router further routes the TCP data packet to the transmission data buffer.

12. The method of claim 11, further comprising:
receiving the TCP data packet by the TCP acknowledgment generator after the TCP data packet is transmitted from the transmission data buffer;
generating, by the TCP acknowledgment generator, the TCP acknowledgment packet in response to the receiving the second packet by the TCP acknowledgment generator; and
transmitting the TCP acknowledgment packet from the TCP acknowledgment generator to the source via the wide area network.

13. An apparatus for use in a satellite communication system, comprising:
a reception data buffer to receive a first packet from a source via the satellite communication system;
a transmission data buffer to store a second packet for transmission; and
a hardware TCP filter to:
forward, at line speed, the first packet to a destination in a local area network,
fetch first information from the first packet in the reception data buffer, and
determine whether the first packet is a TCP data packet based, at least partially, on the first information, wherein:
either a TCP acknowledgment generator is included in the apparatus or the TCP acknowledgment generator is included in a satellite modem for communicating with a wide area network via the satellite communication system and for communicating with the local area network via the apparatus,
when the TCP acknowledgement generator is included in the apparatus:
the TCP acknowledgment generator is arranged to receive incoming information from the reception data buffer and a TCP flag from the hardware TCP filter and is further arranged to provide TCP information in the second packet to the transmission data buffer to be transmitted to the satellite modem, the TCP information in the second packet is provided to the transmission data buffer from the TCP acknowledgment generator when the hardware TCP filter provides a set TCP flag to the TCP acknowledgment generator indicating that the received first packet is the TCP data packet, transmission of the second packet causing a TCP acknowledgment packet to be transmitted to the source of the first packet via the satellite communication system; and
when the TCP acknowledgment generator is included in the satellite modem,
when the hardware TCP filter determines that the first packet is the TCP data packet, the TCP data packet is mirrored to the transmission data buffer for transmission to the satellite modem, and
upon receiving the mirrored TCP data packet, the TCP acknowledgment generator included in the satellite modem generates the TCP acknowledgment packet which is transmitted by the satellite modem via the satellite communication system and the wide area network to the source; and wherein:
the hardware TCP filter is an item selected from a group of items consisting of a complex programmable logic device, a field programmable gate array, and an application specific integrated circuit.

14. The apparatus of claim 13, wherein the hardware TCP filter further comprises:
a TCP/IP packet decoder to fetch an IP version from the first packet in the reception data buffer and provide the IP version to a plurality of IP version comparators, each of the plurality of IP version comparators is associated with a respective version of a plurality of IP versions to determine whether the fetched IP version is any one of the plurality of IP versions;
a plurality of TCP comparators, each respective TCP comparator of the plurality of TCP comparators is associated with a respective IP version comparator of the plurality of IP version comparators, and is for determining whether the first packet is the TCP data packet of a respective one of the plurality of IP versions, and sets a corresponding TCP flag when the respective TCP comparator determines that the first packet is the TCP data packet of the respective one of the plurality of IP versions;
the TCP acknowledgment generator is included in the apparatus to generate the TCP acknowledgment packet and place the generated TCP acknowledgment packet in the transmission data buffer when any one of the corresponding TCP flags indicates that the first packet is the TCP data packet, wherein:
when any one of the plurality of IP version comparators determines that the fetched IP version indicates the respective version of the plurality of IP versions:
the TCP/IP packet decoder fetches protocol information of the respective version from the first packet and provides the protocol information to a TCP comparator associated with the any one of the plurality of IP version comparators, and
the TCP comparator sets a corresponding TCP flag, associated with the respective version, when the comparator determines that the first packet is the TCP data packet of the respective version based on the protocol information; and
the TCP acknowledgment generator generates the TCP acknowledgment packet and places the generated TCP acknowledgment packet in the transmission data buffer for transmission via the satellite communication system when any one of the plurality of TCP flags is set.

15. The apparatus of claim 14, wherein:
the apparatus is arranged to be connected to a receiver and a transmitter, the receiver being for receiving the first packet from the wide area network via the satellite communication system and providing the first packet to the reception data buffer, the transmitter being for receiving the second packet from the transmission data buffer and transmitting the second packet to the source of the first packet via the satellite communication system and the wide area network, and the apparatus is arranged to be connected to the local area network such that an application central processing unit of the apparatus is arranged to receive from and send packets to the local area network.

16. The apparatus of claim 13, wherein the hardware TCP filter further comprises:
a TCP/IP packet decoder to fetch an IP version from the first packet in the reception data buffer and provide the IP version to a plurality of IP version comparators, each of the plurality of IP version comparators is associated with a respective version of a plurality of IP versions to determine whether the fetched IP version is any one of the plurality of IP versions;
a plurality of TCP comparators, each respective TCP comparator of the plurality of TCP comparators is associated with a respective IP version comparator of the plurality of IP version comparators, and is for determining whether the first packet is the TCP data packet of the respective version of the plurality of IP versions, wherein:
when any one of the plurality of IP version comparators determines that the fetched IP version indicates the respective version of the plurality of IP versions:
the TCP/IP packet decoder fetches protocol information of the respective version and provides the protocol information from the first packet, to a TCP comparator associated with the any one of the plurality of IP version comparators, and
the TCP comparator sets a corresponding TCP flag, associated with the respective version, when the TCP comparator determines, based on the protocol information, that the first packet is the TCP data packet of the respective version; and
the first packet and the corresponding TCP flag is provided to a layer 2 switch, which is separate from the apparatus, and is arranged to provide the second packet, including the TCP information, to the transmission data buffer of the apparatus in response to the layer 2 switch receiving the second packet and the corresponding TCP flag.

17. The apparatus of claim 16, wherein:
the second packet, including the TCP information, is arranged to be sent to the TCP acknowledgment generator, separate from the apparatus, the TCP acknowledgment generator is arranged to generate the TCP acknowledgment packet based on the TCP information, the TCP acknowledgment packet is to be transmitted to the source via the satellite communication system.

18. The apparatus of claim 17, wherein:
a receive bus and a transmit bus connect the apparatus to the satellite modem arranged to communicate with the apparatus and with the source via the wide area network, the receive bus is arranged to provide the first packet to the apparatus, and the transmit bus is arranged to transmit the second packet from the apparatus.

* * * * *